United States Patent
Otake

(10) Patent No.: US 6,883,316 B2
(45) Date of Patent: Apr. 26, 2005

(54) CONTROL SYSTEM FOR A TURBO-CHARGED DIESEL AIRCRAFT ENGINE

(75) Inventor: Yukio Otake, Suntou-gun (JP)

(73) Assignee: Toyota Uidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 10/600,450

(22) Filed: Jun. 23, 2003

(65) Prior Publication Data

US 2004/0255583 A1 Dec. 23, 2004

(51) Int. Cl.$^7$ .......................... F02D 23/00; F04D 29/18; F04D 29/26

(52) U.S. Cl. .............................. 60/601; 60/611; 416/29; 416/30

(58) Field of Search .......................... 60/600–603, 611; 123/383; 415/30, 29, 27; F02D 41/02, 41/04, 1/02, 23/00

(56) References Cited

U.S. PATENT DOCUMENTS

| | | | | |
|---|---|---|---|---|
| 2,818,847 A | * | 1/1958 | Mock | 416/29 |
| 3,913,542 A | * | 10/1975 | Uitti et al. | 60/611 |
| 4,054,112 A | * | 10/1977 | Kurokawa et al. | 123/383 |
| 4,512,307 A | * | 4/1985 | Igashira et al. | 123/383 |
| 4,626,170 A | * | 12/1986 | Dorsch | 416/30 |
| 4,864,993 A | * | 9/1989 | Itoh et al. | 123/383 |
| 5,810,560 A | | 9/1998 | Tanaka | 416/27 |
| 6,171,055 B1 | * | 1/2001 | Vos et al. | 416/30 |
| 6,652,233 B2 | * | 11/2003 | Otake | 416/30 |

FOREIGN PATENT DOCUMENTS

| | | | | |
|---|---|---|---|---|
| JP | 04081528 A | * | 3/1992 | F02D/1/02 |
| JP | 07109938 A | * | 4/1995 | F02D/41/02 |
| JP | 07189747 A | * | 7/1995 | F02D/1/02 |
| JP | 08200117 A | * | 8/1996 | F02D/41/02 |
| JP | A 8-303271 | | 11/1996 | F02D/41/04 |
| JP | A 8-324496 | | 12/1996 | 416/27 |
| JP | 09088667 A | * | 3/1997 | F02D/41/04 |
| JP | A 10-18861 | | 1/1998 | F02D/1/02 |
| JP | 2000289494 A | * | 10/2000 | F02D/23/00 |
| JP | A 2001-159356 | | 6/2001 | F02D/41/02 |

* cited by examiner

Primary Examiner—Thai-Ba Trieu
(74) Attorney, Agent, or Firm—Oliff & Berridge, PLC

(57) ABSTRACT

In the control system for a turbo-charged diesel aircraft engine, a target value for a fuel injection amount is determined by the stroke of a throttle lever. A boost compensator determines the maximum limit for the fuel injection amount in accordance with the boost pressure of the engine in order to suppress the formation of exhaust smoke. The actual fuel injection amount is set at the target value or the maximum limit whichever is smaller. An electronic control unit (ECU) calculates an increase rate of the stroke of the throttle lever based on an output of the stroke sensor disposed near the throttle lever. The ECU determines that the current operating condition of the aircraft requires a rapid increase in the engine output power when the increase rate of the stroke is larger than a predetermined value and increases the maximum limit determined by the boost compensator.

16 Claims, 13 Drawing Sheets

CONTROL SYSTEM FOR A TURBO-CHARGED DIESEL AIRCRAFT ENGINE

BACKGROUND OF THE INVENTION

1. Field of the Invention

The present invention relates to a control system for an aircraft engine and, more specifically, it relates to a control system for a turbo-charged diesel engine equipped with a boost compensator.

2. Description of the Related Art

An aircraft equipped with a propeller driven by an internal combustion engine is well known in the art. For example, U.S. Pat. No. 5,810,560 discloses an aircraft equipped with a controllable pitch propeller driven by a gasoline engine. In the aircraft in U.S. Pat. No. 5,810,560, the set speed of propeller governor and the set amount of fuel injection is controlled by a single control lever. In U.S. Pat. No. 5,810,560, as a gasoline engine is used, the engine output is controlled by adjusting the degree of opening of a throttle valve disposed on the air intake passage of the engine, and the propeller governor and the throttle valve are connected to a single control lever by means of link and cam mechanism, and the set speed of the propeller governor and the degree of opening of the throttle valve change simultaneously in accordance with the position of the control lever. Therefore, the engine speed and the engine output power are controlled by a single lever in order to reduce complexity in the control of the aircraft.

A gasoline engine is used in the aircraft in U.S. Pat. No. 5,810,560. When a turbo-charged diesel engine is used for an aircraft, some problems occur.

In a gasoline engine, the engine output power is controlled by the degree of opening of the throttle valve. More specifically, the amount of engine intake air is determined by degree of opening of the throttle valve, and the amount of fuel supplied to the engine is automatically controlled so that combustion air-fuel ratio of the engine is kept at a predetermined value.

Therefore, the combustion air-fuel ratio does not change even if the engine output power is changed in a gasoline engine.

However, in a turbo-charged diesel engine, the intake air amount of the engine is not controlled by a throttle valve and is determined by the engine speed and the intake air pressure (i.e., the boost pressure). The engine output power is controlled by changing the amount of fuel injection. Therefore, a combustion air-fuel ratio changes in output power (the fuel injection amount). Thus, in some operating conditions, if the combustion air-fuel ratio becomes excessively low, exhaust smoke will be formed due to a shortage of combustion air.

Although the engine speed (the propeller speed) and the engine output power are controlled by a single lever in U.S. Pat. No. 5,810,560, even if the propeller speed and the engine output power are controlled separately by a speed lever and a throttle lever, this exhaust smoke problem also occurs.

In order to prevent the formation of exhaust smoke, a boost compensator is used in some turbo-charged diesel engines. The boost compensator is an apparatus that restricts the fuel injection amount to a value less than a maximum limit (i.e., so called "a smoke limit") corresponding to an allowable lowest air-fuel ratio. The allowable lowest air-fuel ratio is a lowest air-fuel ratio on which the engine can operate without forming exhaust smoke. As the amount of air charged into cylinders of the engine increases as the boost pressure increases, the maximum limit of the fuel injection amount is determined by the boost pressure.

If a boost compensator is used for an aircraft turbo-charged diesel engine, as the combustion air-fuel ratio is controlled at a value lower than the smoke limit, an exhaust smoke problem does not occur.

However, if a boost compensator is used for an aircraft turbo-charged diesel engine, another problem occurs. In the aircraft operation, in some cases, it is necessary to increase the engine output power rapidly. For example, during a landing of the aircraft, if it is required to abort a landing operation and to raise the aircraft to a certain altitude (i.e., if so called a "go-around" is required), a rapid increase in engine output power is required.

In this case, however, if the engine is equipped with a boost compensator, it is difficult to increase the engine output power rapidly. If a boost compensator is used, the maximum amount of fuel supplied to the engine is restricted by the smoke limit regardless of, for example, the position of a throttle lever. As the smoke limit is determined by the boost pressure of the engine, the rate of increase in the amount of fuel supplied to the engine is restricted by the rate of increase in the boost pressure. Therefore, even if the throttle lever is operated rapidly in order to rapidly increase the engine output power, the actual engine output power, i.e., the actual fuel supply amount does not increase largely until the boost pressure increases.

Therefore, if a boost compensator is used, it is difficult to rapidly increase the engine output power.

It is true that, if the maximum limit of the fuel supply set by the boost compensator is set at a value larger than the smoke limit, the problem in increasing the engine output power may be solved. However, if the maximum limit of the boost compensator is set at a value larger than the smoke limit, the formation of exhaust smoke may occur even in a steady operation of the engine.

SUMMARY OF THE INVENTION

In view of the problems in the related art as set forth above, an object of the present invention is to provide a control system for a turbo-charged diesel aircraft engine equipped with a boost compensator capable of increasing engine output power rapidly in an emergency case while suppressing the formation of exhaust smoke during a steady operation of the engine.

The object as set forth above is achieved by a control system for a turbo-charged diesel aircraft engine, according to the present invention, comprising a throttle lever, a fuel setting device that sets the target amount of fuel supplied to the engine in accordance with the amount of stroke of the throttle lever, a boost compensator that sets the maximum limit for the amount of fuel supplied to the engine and a fuel supply device that supplies fuel to the engine in an amount equal to the target amount or the maximum limit whichever is smaller, wherein the system further comprises operating condition determining means for determining whether the current aircraft operating condition is a condition where the rate of increase in the engine output power should be increased, and a switching means for increasing the maximum limit set by the boost compensator when it is determined by the operating condition determining means that the current operating condition is a condition where the rate of increase in the engine output power should be increased.

According to the present invention, the amount of fuel actually supplied to the engine is set at the target fuel injection amount determined by the amount of stroke of the throttle lever or the maximum limit determined by the boost compensator in accordance with the boost pressure whichever is smaller. Therefore, when an increase in the engine output power is required, the actual amount of fuel supplied to the engine is likely to be limited by the maximum limit set by the boost compensator even though the target fuel amount is set at a large value. As the maximum limit is set to a relatively small value in order to prevent the formation of exhaust smoke, the rate of increase in the engine output power also becomes small.

In the present invention, the operating condition determining means increases the maximum limit set by the boost compensator when the operating condition requires a rapid increase in the engine output power. Therefore, the engine output power can be increased rapidly when the operating condition requires a large engine output power. Further, as the maximum limit set by the boost compensator is set at a relatively small value when the operating condition does not require the rapid increase in the engine output power, the formation of exhaust smoke does not occur in a normal operation of the aircraft.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the control system for a turbo-charged diesel aircraft engine according to the present invention will be explained with reference to FIGS. 1 through 13.

Figure 1:
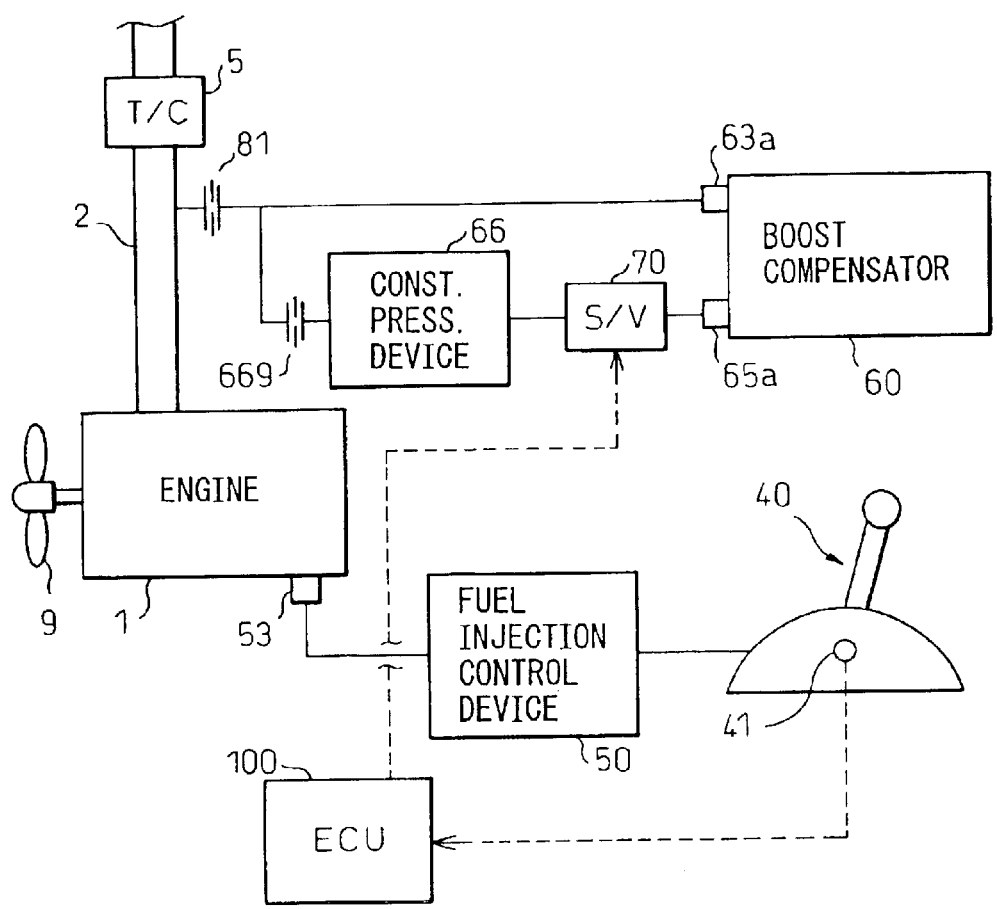
FIG. 1 schematically illustrates a general configuration of an embodiment of the present invention.

FIG. 1 schematically illustrates an embodiment of a control system for a turbo-charged diesel aircraft engine according to the present invention. In FIG. 1, numeral 1 designates an internal combustion engine for an aircraft. In this embodiment, the engine 1 is a multiple-cylinder type turbo-charged diesel engine. The output shaft of the engine 1 is connected to a propeller 9. Numeral 2 designates an intake air passage of the engine 1. In the intake air passage 2, a turbocharger 5 for pressurizing intake air of the engine is disposed.

In FIG. 1, numeral 50 designates a fuel injection control device. The fuel injection control device 50 comprises a fuel pump (not shown) for supplying pressurized fuel to the injection valves 53 (only one fuel injection valve 53 is shown in FIG. 1) disposed on the respective cylinders of the engine 1 for injecting fuel into the respective cylinders.

In this embodiment, a throttle lever 40 is provided for adjusting the fuel injection amount set by the fuel injection control device 50. In this embodiment, though not shown in FIG. 1, the engine speed (propeller speed) governor for adjusting the target speed of the engine 1 is provided. Since any known type of propeller speed governor can be used in the present embodiment, no detailed explanation will be given here. Further, though the engine output power (fuel injection amount) is controlled separately by the throttle lever 40, the present invention can be also applied to a control system that control the propeller speed and the fuel injection amount by a single lever as stated in U.S. Pat. No. 5,810,560.

In this embodiment, a boost compensator 60 is provided. The boost compensator 60 restricts the fuel injection amount to a maximum limit values determined by the boost pressure in accordance with a predetermined relationship between the boost pressure and the maximum limit.

In this embodiment, a mechanical type boost compensator is used. The boost compensator 60 has two pressure supply ports 63a and 65a. A boost pressure port 63a of the boost compensator 60 is connected to the intake air passage 2 via an orifice 81 in order to introduce the boost pressure in the intake air passage 2 into the boost compensator 60. Further, a reference pressure port 65a is connected to a constant pressure device 66 via a switching valve 70.

In FIG. 1, numeral 100 designates an electronic control unit (ECU) for the engine 1. The ECU 100 may be a microcomputer including ROM, RAM, CPU and input/output interface connected, by a bi-directional bus, to each other. The ECU 100 performs basic control of the engine such as fuel injection control and engine speed control. Further, in this embodiment, the ECU 100 performs the boost compensator control explained later.

In order to perform these controls, a stroke signal corresponding the stroke of the throttle lever 40 is supplied to the input/output interface from a stroke sensor 41 disposed near the throttle lever 40. Further, input/output interface is connected to the solenoid actuator of the switching valve 70 in order to switch the position of the valve 70 between the closed position and the open position.

Figure 2:
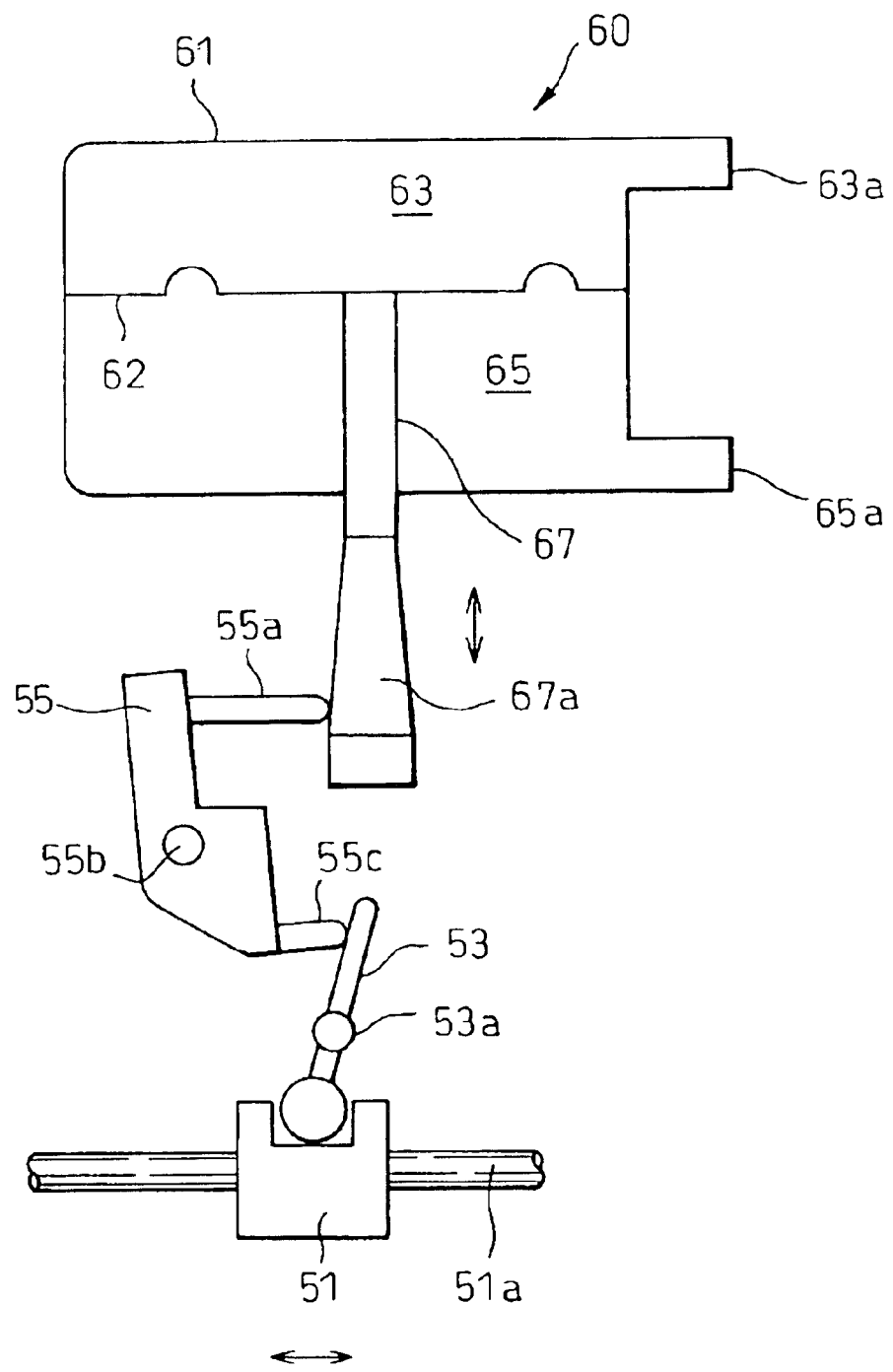
FIG. 2 shows the construction of the boost compensator in FIG. 1.

FIG. 2 shows the detail of the boost compensator 60 in FIG. 1. The boost compensator 60 is provided with a housing 61 in which two chambers 63 and 65 are formed. The two chambers, i.e., a boost pressure chamber 63 and a backpressure chamber 65 are divided by a flexible diaphragm 62. A boost pressure of the engine 1 is introduced to the boost pressure chamber 63 from the boost pressure port 63a via an orifice 81 (FIG. 1). The backpressure chamber 65 is connected to a constant pressure device 66 through a reference pressure port 65a and switching valve 70. The constant pressure device 66 generates a constant pressure (in this embodiment, a pressure slightly higher than 1 bar) regardless of the altitude of the aircraft and the operating condition of the engine.

In FIG. 1, the switching valve 70 is a solenoid operated three-way valve and, in accordance with a control signal from electronic control unit (ECU) 100, takes one of a closed position where the backpressure chamber 65 is connected to the constant pressure device 66 and an open position where the backpressure chamber 65 communicates to the atmosphere.

Thus, when the switching valve 70 is at the closed position, the pressure in the backpressure chamber 65 of the boost compensator 60 is always kept at a predetermined constant pressure slightly higher than 1 bar.

In FIG. 2, numeral 67 designates a control rod connected to the diaphragm 62 and moves together with the displacement of the diaphragm 62. Namely, when the diaphragm 62 deflects upward or downward, the control rod 67 also moves upward or downward accordingly. The amount of the deflection of the diaphragm 62 is proportional to the pressure difference between the boost pressure chamber 63 and the backpressure chamber 65. When the backpressure chamber 65 is connected to the constant pressure device through the switching valve 70, as the pressure in the backpressure chamber 65 is constant, the amount of the deflection of the diaphragm 62, i.e., the amount of the vertical movement of the control rod 67 is determined by the boost pressure.

The diameter of the control rod 67 varies in the axial direction so that a tapered portion 67a is formed on the control rod 67.

Numeral 55 in FIG. 2 is a control arm capable of pivoting around a center pin 55b. The control arm 55 is provided with a follower 55a that contacts the side of the control rod 67 and, a push rod 55c. The push rod 55c of the control arm 55 abuts an end of the tension arm 53 that pivots around a pin 53a. The other end of the tension arm 53 is attached to the spill ring 51 of the fuel injection pump.

In this embodiment, the fuel injection amount is determined by the spill ring 51. When the set amount of the fuel injection is increased by the operation of the throttle lever 40, the spill ring 51 is urged toward the rightward direction in FIG. 2 by an urging mechanism not shown in the drawing.

When the spill ring 51 moves rightward direction, the tension arm 53 turns to a counterclockwise direction around the pin 53a. This movement of the tension arm 53 is transferred to the control arm 55 by the push rod 55c and, the control arm 55 turns toward the clockwise direction until the follower 55a thereof abuts the tapered portion 67a or the control rod 67. Once the follower 55a abuts the control rod 67, the control arm 55 and the tension arm 53 cannot turn any more. Therefore, the movement of the spill ring 51 toward the rightward direction is stopped. Thus, the upper limit of the fuel injection amount is determined by the position of the control arm 55, more specifically, the position where the follower abuts the tapered surface 67a of the control rod 67.

As explained above, the control rod 67 is provided with a tapered portion 67a where the diameter of the rod decreases toward the upward direction. When the boost pressure is higher, as the control rod extends downward, the diameter of the tapered portion 67a where the follower 55a of the control arm 55 abuts becomes smaller. This allows the control arm 55 to turn further toward the clockwise direction. Therefore, when the boost pressure is higher, the spill ring 51 is allowed to move further toward rightward direction. In other words, the maximum limit of the fuel injection amount becomes larger as the boost pressure increases.

Because the displacement of the control rod 67 is proportional to the pressure difference between the boost pressure chamber 63 and the backpressure chamber 65, the maximum limit position of the spill ring 51, i.e., the maximum fuel injection amount increases in proportional to the increase in the boost pressure.

Figure 3:
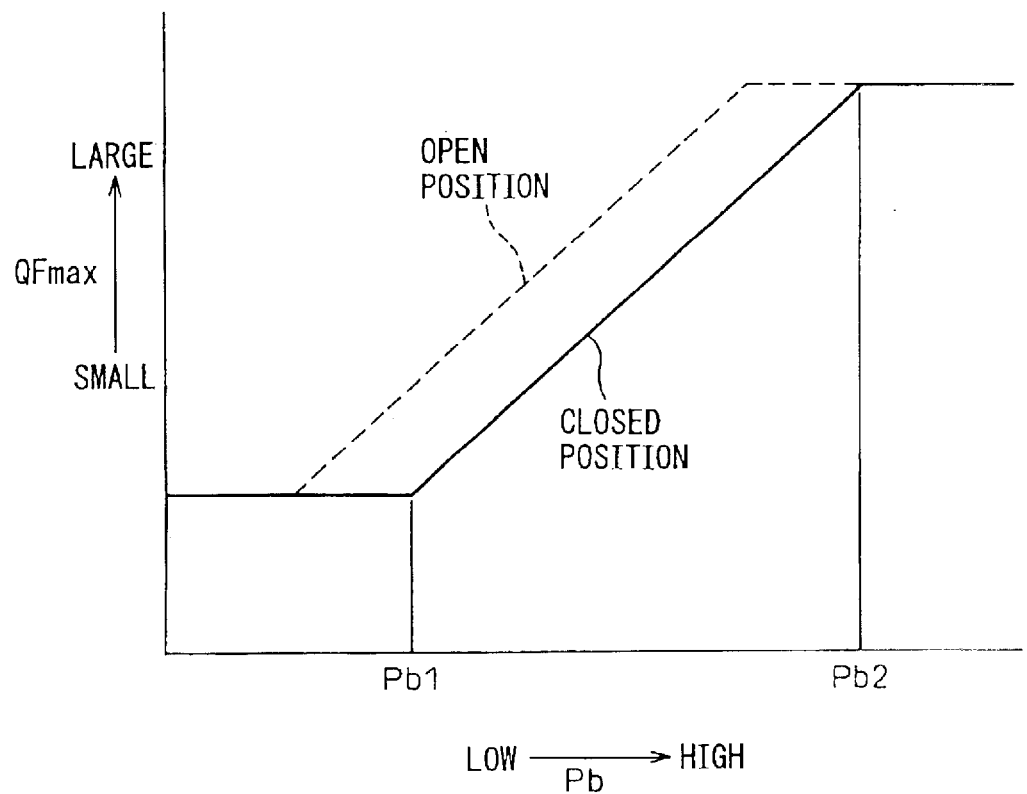
FIG. 3 shows an example of the relationship between the maximum limit QFmax for the fuel injection amount and the boost pressure Pb set by the boost compensator in FIG. 2.

FIG. 3 shows the relationship between the maximum fuel injection amount QFmax and the boost pressure Pb set by the boost compensator in FIG. 2. A solid line in FIG. 3 shows the relationship between QFmax and Pb when the constand pressure device 66 is connected to the reference pressure port 65a. As can be seen from FIG. 3, the maximum fuel injection amount QFmax is set at constant values when the boost pressure Pb is smaller than Pb1 and larger than Pb2 because the follower 55a abuts the straight (a constant diameter) portion of the control rod 67 on both sides of the tapered portion 67a in these boost pressure ranges. The maximum fuel injection amount QFmax increases in proportion to the boost pressure Pb in the pressure range between Pb1 and Pb2.

In this embodiment, the relationship between the maximum fuel injection amount QFmax and the boost pressure Pb is determined so that the maximum fuel injection amount QFmax is smaller than the smoke limit in order to suppress the formation of exhaust smoke.

Figure 4:
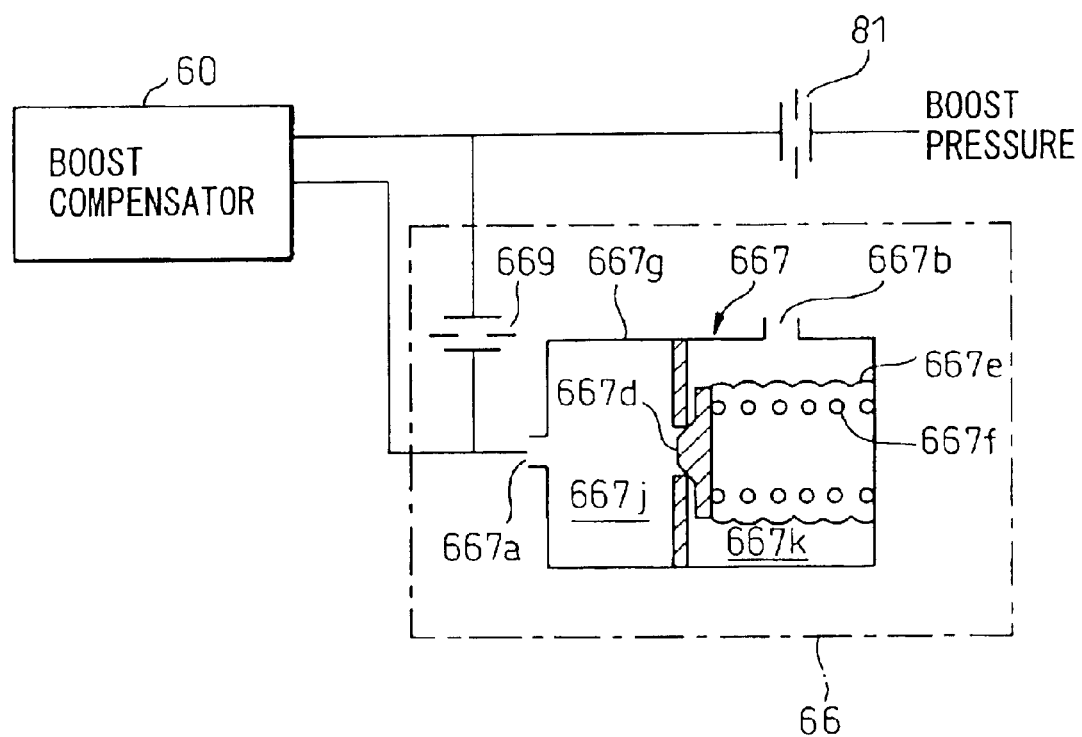
FIG. 4 is a drawing showing an embodiment of the construction of constant pressure device in FIG. 1.

FIG. 4 shows an embodiment of the constant pressure device 66. The constant pressure device 66 in FIG. 4 generates a constant pressure by reducing the boost pressure by a pressure-reducing valve 667. The pressure reducing valve 667 used in the constant pressure device 66 in this embodiment is a so-called "an absolute pressure relief valve". The absolute pressure relief valve 667 is a valve that is capable of maintaining the pressure in the system lower than a predetermined constant pressure regardless of the ambient pressure.

As shown in FIG. 4, the absolute pressure relief valve 667 has a housing 667g and two chambers 667j and 667k formed in the housing. The chambers 667j and 667k communicate each other through a valve 667d. The chamber 667j is connected to the backpressure chamber 65 and, in this embodiment, the boost pressure is supplied to the chamber 667j through an orifice 669 by a port 667a on the housing 667g. The chamber 667k communicates to atmosphere through a port 667b. Therefore, when the valve 667d opens, the pressurized boost air is released to the atmosphere through the orifice 669, chamber 667j, valve 667d and the chamber 667k.

As shown in FIG. 4, the valve 667d is urged to its closing position by a compression spring 667f. In this embodiment, a bellows 667e is attached to the back of the valve 667d and surrounds the compression spring 667f. Further, the bellows 667e is sealed to maintain a predetermined pressure (such as a vacuum pressure, i.e., a pressure lower than the atmospheric pressure on the ground) inside thereof.

As the back of the valve body of the valve 667d is completely covered by the bellows 667e, the pressure in the chamber 667k (i.e., the atmospheric pressure) is not exerted on the backside of the valve body of the valve 667d. Therefore, only the force generated by the compression spring 667f and the pressure in the bellows 667e urge the valve body of the valve 667d to the closing position. In other words, the valve body is urged to its closing position by a constant force (a valve closing force).

When the pressure in the chamber 667j increases to a certain pressure (a valve opening pressure), the force exerted on the valve body of the valve 667d by the pressure in the chamber 667j exceeds the above-noted valve closing force and the valve 667d opens. As the valve closing force is constant, the valve opening pressure in the chamber 667j becomes also constant.

Therefore, the pressure of the boost air supplied through the orifice 669 is reduced to a constant pressure by the absolute pressure relief valve 667. Thus, the pressure in the backpressure chamber 65 of the boost compensator 60 is always kept at a constant value regardless of the boost pressure and the altitude of the aircraft when the boost pressure chamber 65 is connected to the constant pressure device 66. In this embodiment, the boost pressure changes, for example, from 120 to 250 KPa, and the backpressure chamber 65 is kept at a pressure slightly higher than the atmospheric pressure at ground level (1 bar).

When the pressure in the backpressure chamber 65 is kept at a constant value by the constant pressure device 66, the relationship between the maximum fuel injection amount QFmax and the boost pressure Pb is set at the solid line in FIG. 3.

The QFmax designated by the solid line in FIG. 3 is a maximum fuel injection amount that makes the air-fuel ratio of the combustion a relatively high (a lean) air-fuel ratio in order to prevent the formation of exhaust smoke. Therefore, if the maximum fuel injection amount is limited by the solid line in FIG. 3, a problem occurs in which the increase in the engine output becomes slow even when a rapid increase in the engine output is required.

In some operations of an aircraft, a rapid increase in the engine output is required by the pilot. A typical such operation is a so-called "go-around" operation. The go-around operation is an emergency operation performed in order to raise the aircraft body when a landing operation of the aircraft is aborted for some reason or other. Therefore, in the go-around operation, the engine output power must be increased as rapidly as possible in order to pull up the aircraft body from its landing path. Thus, if the boost compensator 66 controls the maximum fuel injection amount at the QFmax value represented by the solid line in FIG. 3 even in emergencies such as the go-around operation, a problem of delay in the increase in the engine output power will occur.

In this embodiment, in order to solve this problem, a switching valve 70 is disposed on the line connecting the constant pressure device 66 to the boost pressure chamber 65 of the boost compensator 60. As explained before, switching valve 70 is a solenoid operated type three-way valve and can be switched between a closed position and an open position in accordance with a command signal from the ECU 100. When the switching valve 70 is at the closed position, the backpressure chamber of the boost compensator 60 is connected to the constant pressure device 66 and the QFmax is controlled in accordance with the solid line in FIG. 3. In this condition, as the fuel injection amount of the engine is always limited to a value smaller than the smoke limit, the formation of exhaust smoke does not occur.

When a rapid increase in the engine output power is required, such as in the go-around operation, the ECU 100 in this embodiment switches the position of the switching valve 70 to the open position.

When the switching valve 70 is at the open position, the backpressure chamber 65 in the boost compensator 60 is connected to the atmosphere. Therefore, the pressure in the backpressure chamber falls from the constant pressure, which is higher than 1 bar, to the atmospheric pressure (1 bar at maximum).

This causes the difference pressure between the boost pressure chamber 63 and the backpressure chamber 65 to increase. Therefore, the amount of deflection of the diaphragm 62 (FIG. 2) of the boost compensator 60 increases even if the boost pressure is the same.

As the deflection of the diaphragm 62 increases, the QFmax line in FIG. 3 shifts to the left direction when the switching valve 70 is switched to the open position as indicated by the broken line in FIG. 3. Therefore, the maximum fuel injection limit QFmax becomes larger when the switching valve 70 is switched to the open position. Thus, according to the present embodiment, by increasing the maximum limit for the fuel injection amount by switching the switching valve 70 to the open position, a rapid increase in engine output power can be obtained during emergency operation such as the go-around operation.

Figure 5:
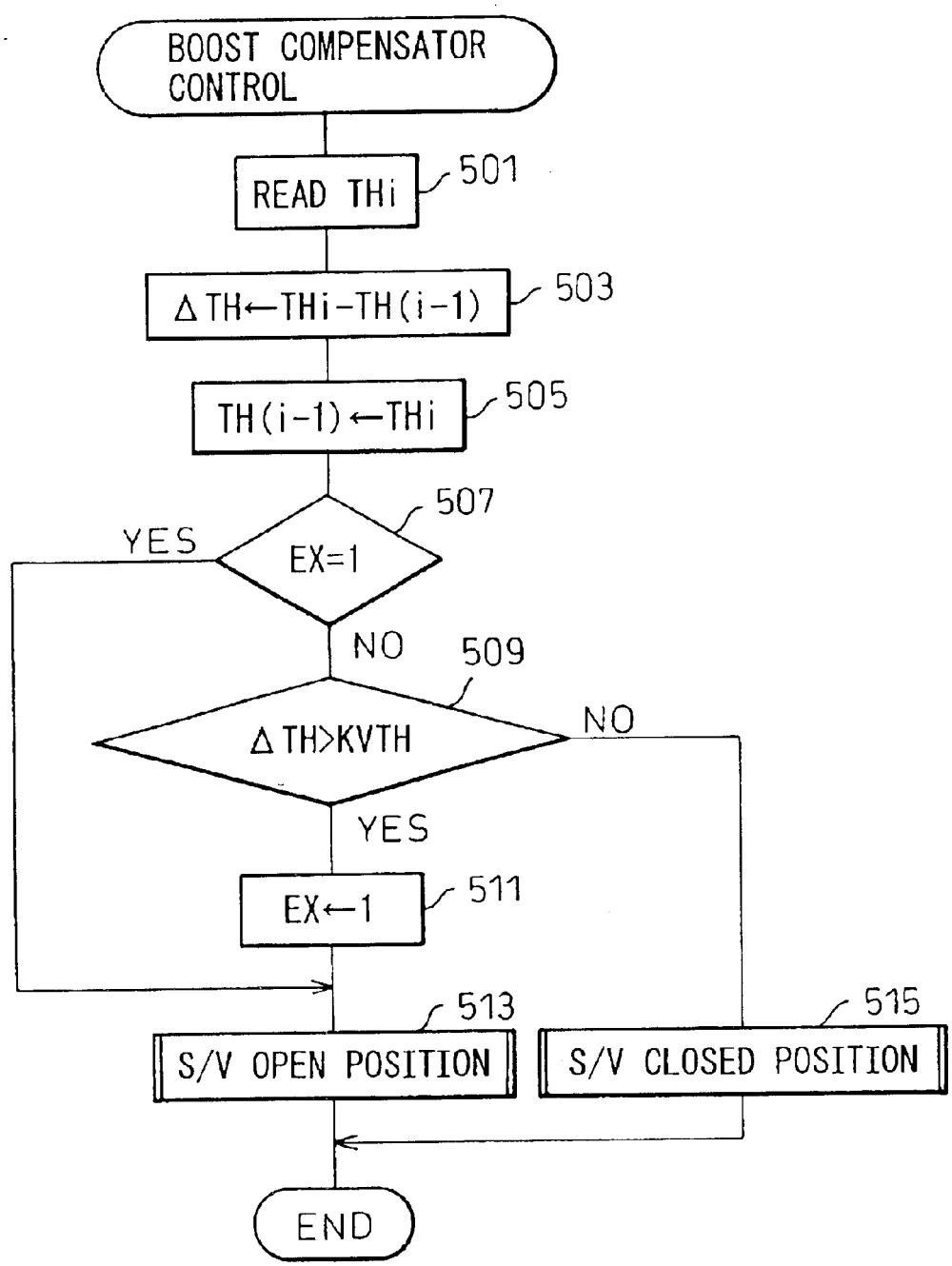
FIG. 5 is a flowchart explaining an example for the boost compensator control operation according to the present invention.

FIG. 5 is a flowchart showing an example for the boost compensator control operation as explained above.

In this embodiment, the ECU 100 detects the amount of stroke of the throttle lever 40 and calculates the rate of change in the throttle stroke. Further, the ECU 100 switches the valve 70 to the open position when the rate of the change in the stroke of the throttle lever 40 exceeds a predetermined value. As a pilot of an aircraft requires a rapid increase in the engine output power when the throttle lever 40 is operated quickly, it becomes possible to detect the requirement, by the pilot, for a rapid increase in the engine output power by monitoring the rate of increase in the throttle lever stroke.

The operation in FIG. 5 is performed as a routine executed by the ECU 100 at regular intervals.

In FIG. 5, at step 501, the stroke THi of the throttle lever 40 is read from the stroke sensor 41 disposed near the throttle lever 40. At step 503, the rate of increase in the stroke $\Delta$TH is calculated by $\Delta$H=THi−TH(i−1). THi is a current stroke of the throttle lever 40 read at step 501 and TH(i−1) is a stroke read when the operation in FIG. 5 is last executed. Since the operation in FIG. 5 is executed at regular intervals, the value $\Delta$TH represents the rate of the increase in the throttle lever stroke.

After calculating $\Delta$TH, the value of TH(i−1) is renewed in order to prepare for next execution of the operation at step 505.

At step 507, it is determined whether the value of a flag EX is set at 1. EX is a flag used for maintaining the switching valve position when the switching valve 70 is switched to open position. The value of the flag EX is initialized to 0 when the engine 1 is started.

If EX≠1 at step 507, it is determined at step 509 whether the rate of increase $\Delta$TH in the throttle lever stroke is larger than a predetermined value KVTH. KVTH is a value large enough to indicate that the pilot requires a rapid increase in the engine output power.

If $\Delta$TH is larger than KVTH at step 509 the operation executes step 511 to set the value of the flag EX to 1 and switches the position of the switching valve 70 to the open position. Thus, the ambient pressure is introduced into the backpressure chamber 65 of the boost compensator 60 and the maximum limit QFmax is increased to the value determined by the broken line in FIG. 3. If the rate $\Delta$TH is smaller than or equal to KVTH at step 509, because this means that the pilot does not require a rapid increase in the engine output power, the switching valve 70 is maintained at its closed position.

Once the flag EX is set to 1 at step 511, the operation always executes step 513 after executing step 507. Therefore, once it is switched to the open position, the switching valve 70 is kept at its open position unless the flag EX is reset to 0 by a manual operation executed by the pilot at an appropriate timing. Thus, when the throttle lever is stopped at the maximum stroke position, the maximum limit QFmax is maintained at increased values even though the rate of the change in the stroke of the throttle lever becomes 0.

Next, a second embodiment of the present invention will be explained with reference to FIGS. 6 and 7.

Figure 6:
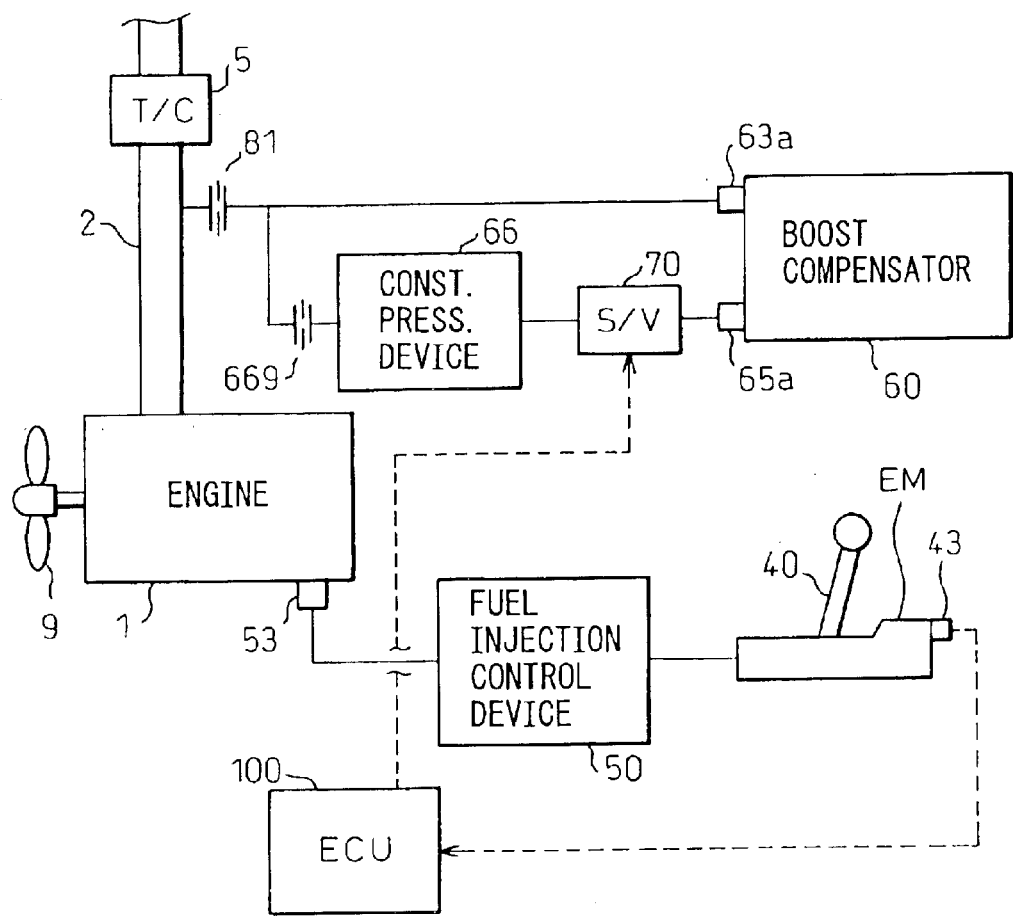
FIG. 6 is a drawing similar to FIG. 1, showing a general configuration of a second embodiment of the present invention.

FIG. 6 is a drawing similar to FIG. 1 and showing a general configuration of the second embodiment.

The configuration in FIG. 6 is different from that in FIG. 1 in that an emergency position switch 43 instead of the stroke sensor 41 in FIG. 1 is disposed near the throttle lever 40. Further, the throttle lever 40 can travel to an emergency position EM disposed outside of the maximum stroke position. Namely, as shown in FIG. 3, the throttle lever 40 is temporarily stopped by a detent mechanism when it reaches the maximum stroke position. However if the lever 40 is operated with a sufficiently large force, the lever 40 can override the detent mechanism and can reach a emergency position outside of the maximum stroke position in order to activate the emergency position switch 43.

When the emergency position switch is activated, the ECU 100 switches the switching valve 70 to its open position.

Therefore, in an emergency, the pilot can increase the engine output power rapidly by merely operating the throttle lever 40 to the emergency position.

After the emergency operation such as the go-around is completed, the throttle lever 40 is returned to its normal operating position by the pilot and the emergency switch is deactivated accordingly. When the emergency switch is deactivated, the ECU 100 switches the switching valve 70 to its closed position. Thus, after emergency operation is completed, the maximum fuel injection amount of the engine is again restricted by the solid line in FIG. 3.

Figure 7:
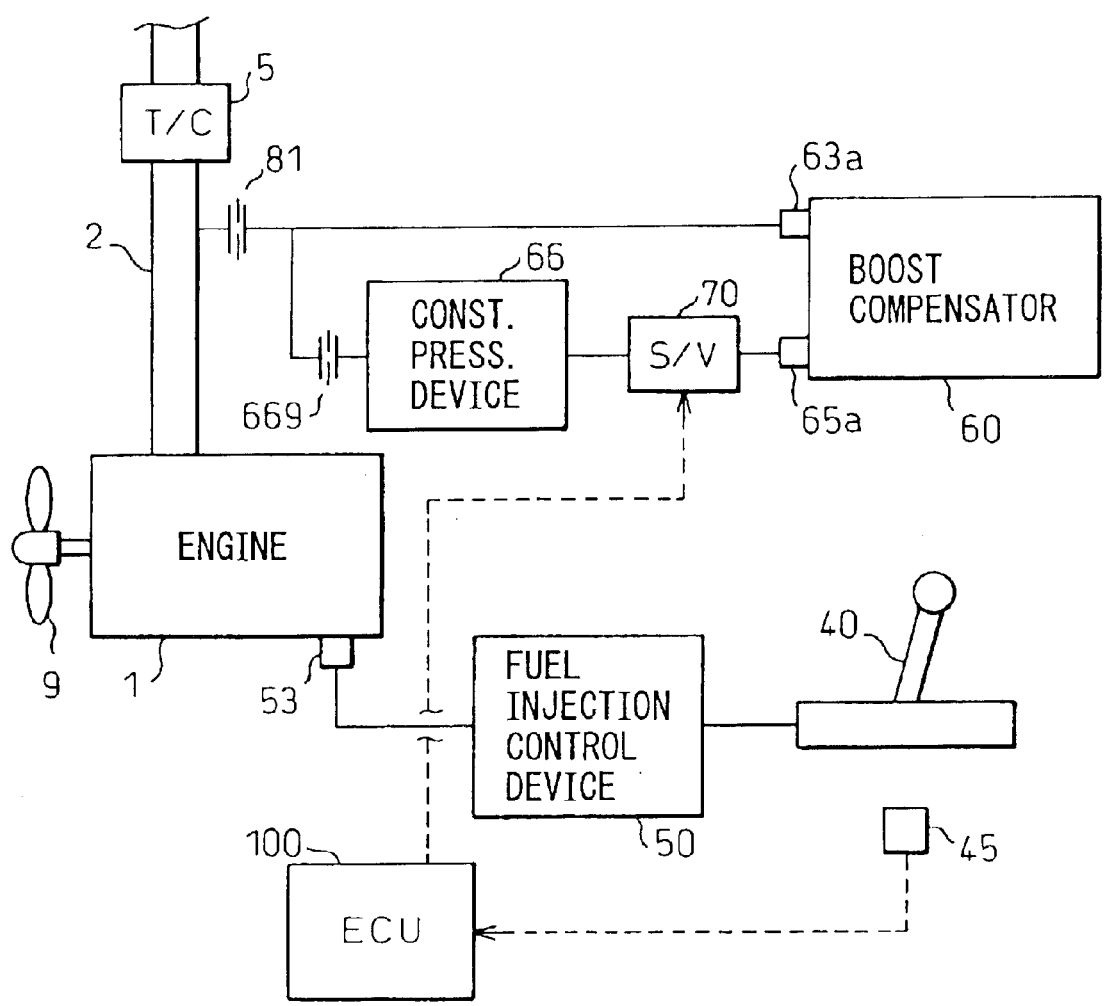
FIG. 7 is a drawing similar to FIG. 6, showing a general configuration of a third embodiment of the present invention.

FIG. 7 is a third embodiment of the present invention, in which the emergency switch 43 in FIG. 6 is replaced with a go-around switch 45. The go-around switch 45 is usually installed in an aircraft having an autopilot system and is manually activated by a pilot for canceling the autopilot system in order to abort a landing operation and execute the go-around operation. In this embodiment, when the go-around switch is activated, the ECU 100 switches the switching valve 70 to its open position in order to increase the maximum limit for the fuel injection amount. Therefore, according to the present embodiment, when the autopilot is cancelled in order to execute the go-around operation, the maximum limit for the fuel injection amount is simultaneously increased.

Figure 8:
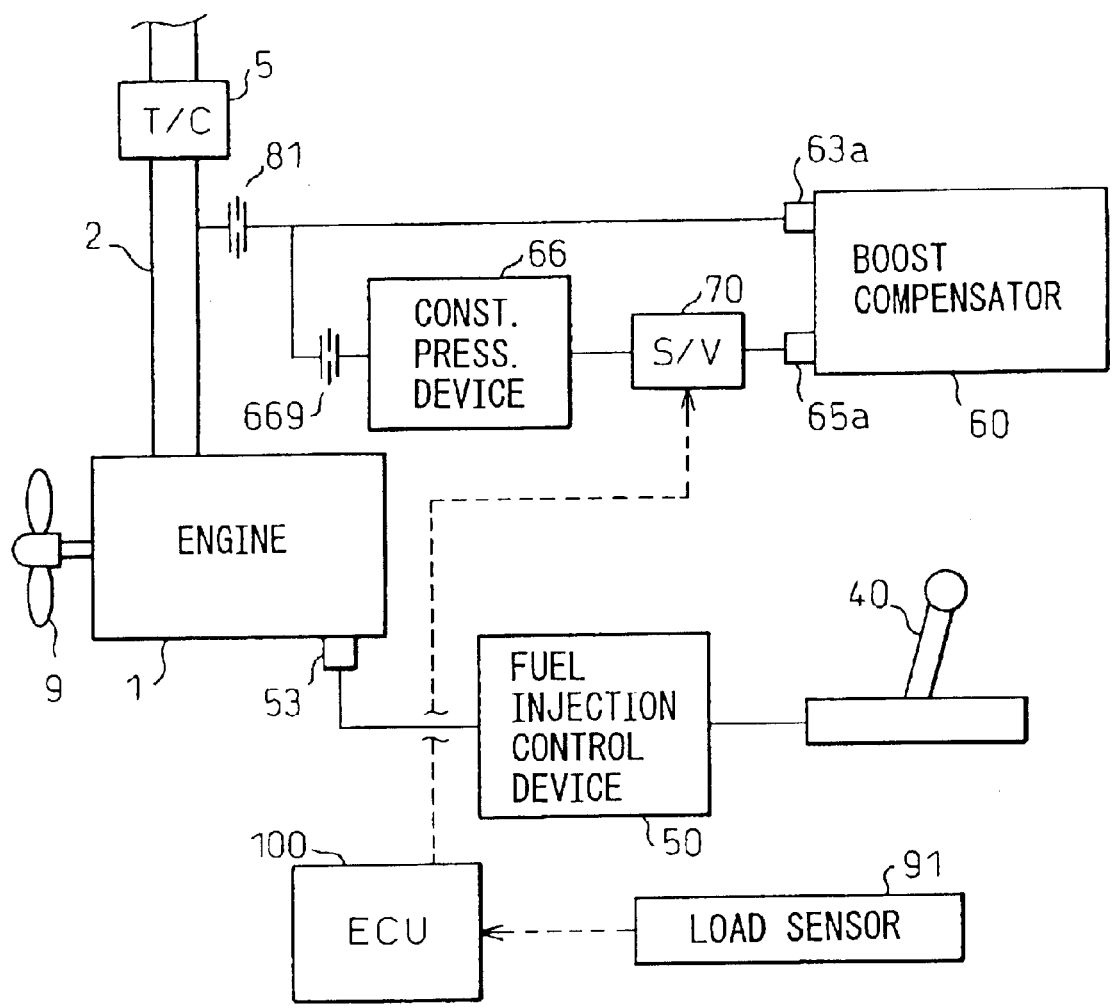
FIG. 8 is a drawing similar to FIG. 1, showing a general configuration of a fourth embodiment of the present invention.

FIG. 8 is a drawing similar to FIG. 1 and shows a general configuration of a fourth embodiment of the present invention.

The embodiment in FIG. 8 is different from that in FIG. 1 in that a load sensor 91, instead of the stroke sensor 41, is disposed near the landing gear of the aircraft. The load sensor 91 detects whether the landing gear of the aircraft is contacting the ground by detecting the load exerted on the landing gear.

Figure 9:
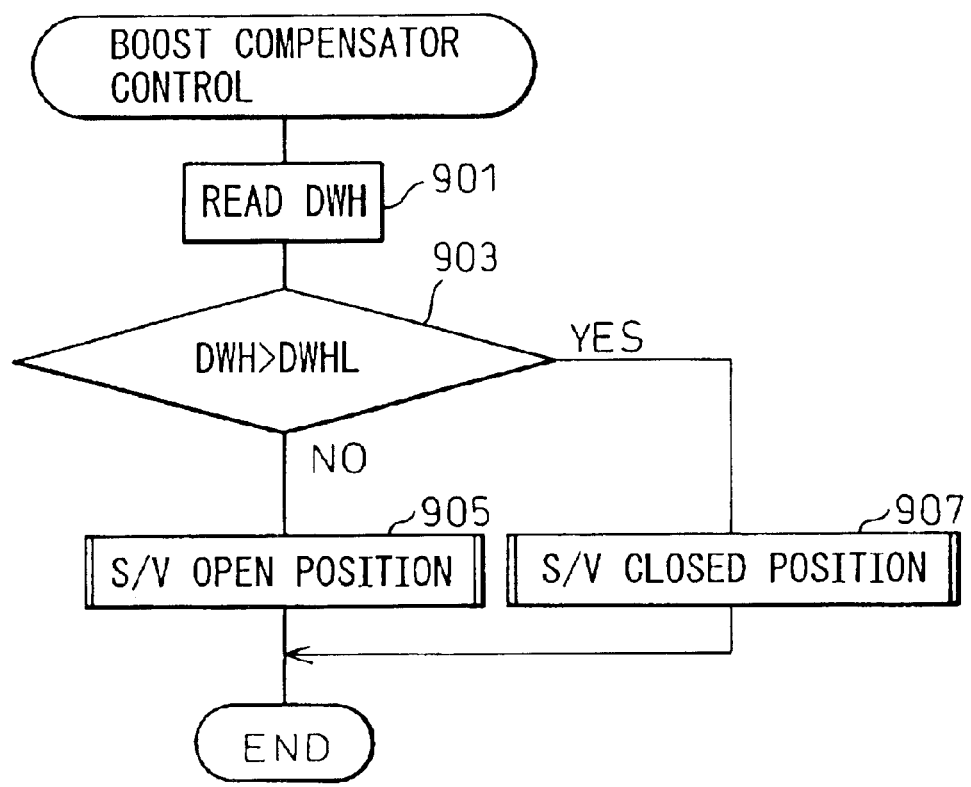
FIG. 9 is a flowchart explaining the boost compensator control operation in the embodiment in FIG. 8.

FIG. 9 is a flowchart explaining the boost compensator control operation in the present invention. In this embodiment, the ECU 100 reads the load DWH exerted on the landing gear from the load sensor 91 (step 901 in FIG. 9) and determines whether the landing gear is touching the ground (step 903). Whether the landing gear is touching the ground or not is determined based on the load DWH detected by the load sensor 91. In this embodiment, it is determined that the landing gear is touching the ground when the load DWH detected by the load sensor 91, i.e., the load exerted on the landing gear is larger than a predetermined value DWHL.

The ECU 100 switches the switching valve 70 to the open position when it is determined that the landing gear is not touching the ground (i.e., when the aircraft is flying) at step 905. When the landing gear is touching the ground, i.e., when the aircraft is on the ground, the ECU 100 keep the switching valve 70 at the closed position at step 907.

According to the present embodiment, the formation of exhaust smoke is suppressed when the aircraft is on the ground and, when the aircraft is in the air, the maximum limit of the fuel injection amount is increased so that a rapid increase in the engine output power can be obtained.

Figure 10:
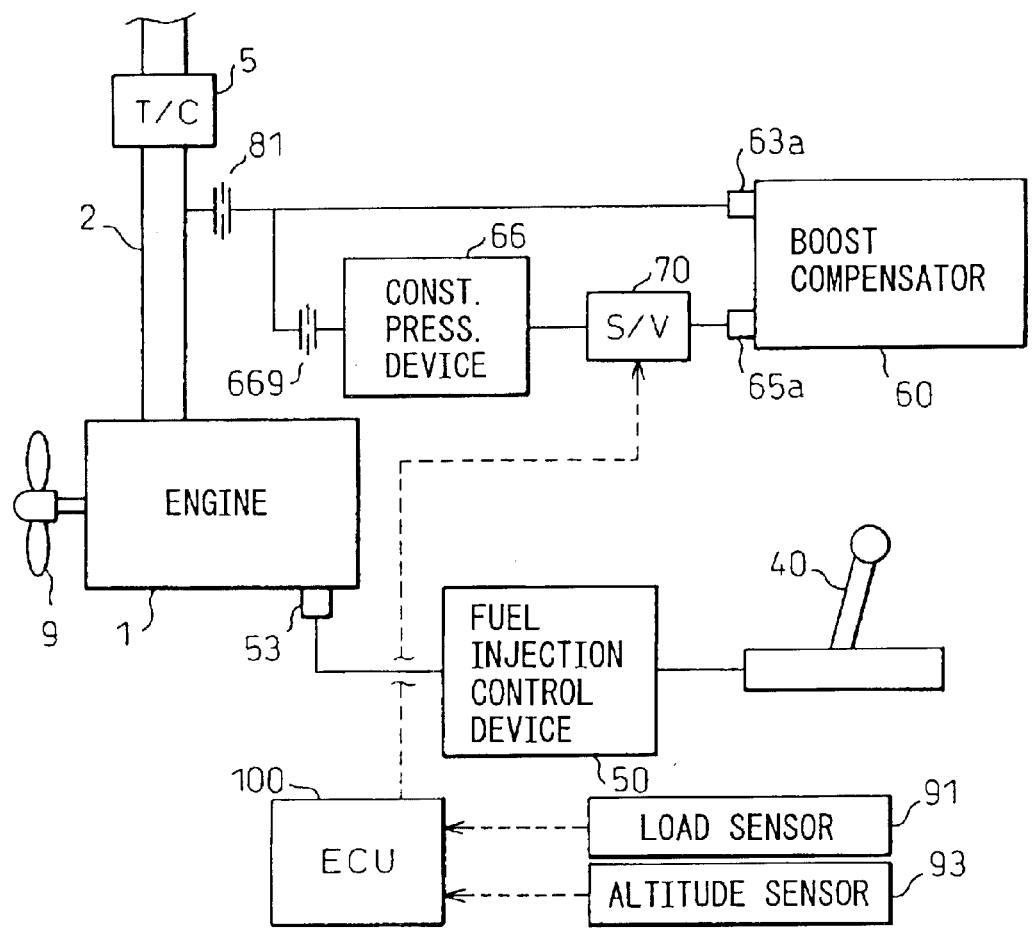
FIG. 10 shows an embodiment that is a variation of the embodiment in FIG. 8.

FIG. 10 shows an embodiment which is a variation of the embodiment in FIG. 1.

In this embodiment, an altitude sensor 93, in addition to the load sensor 91, is disposed on the aircraft body and the output thereof is supplied to the ECU 100.

Figure 11:
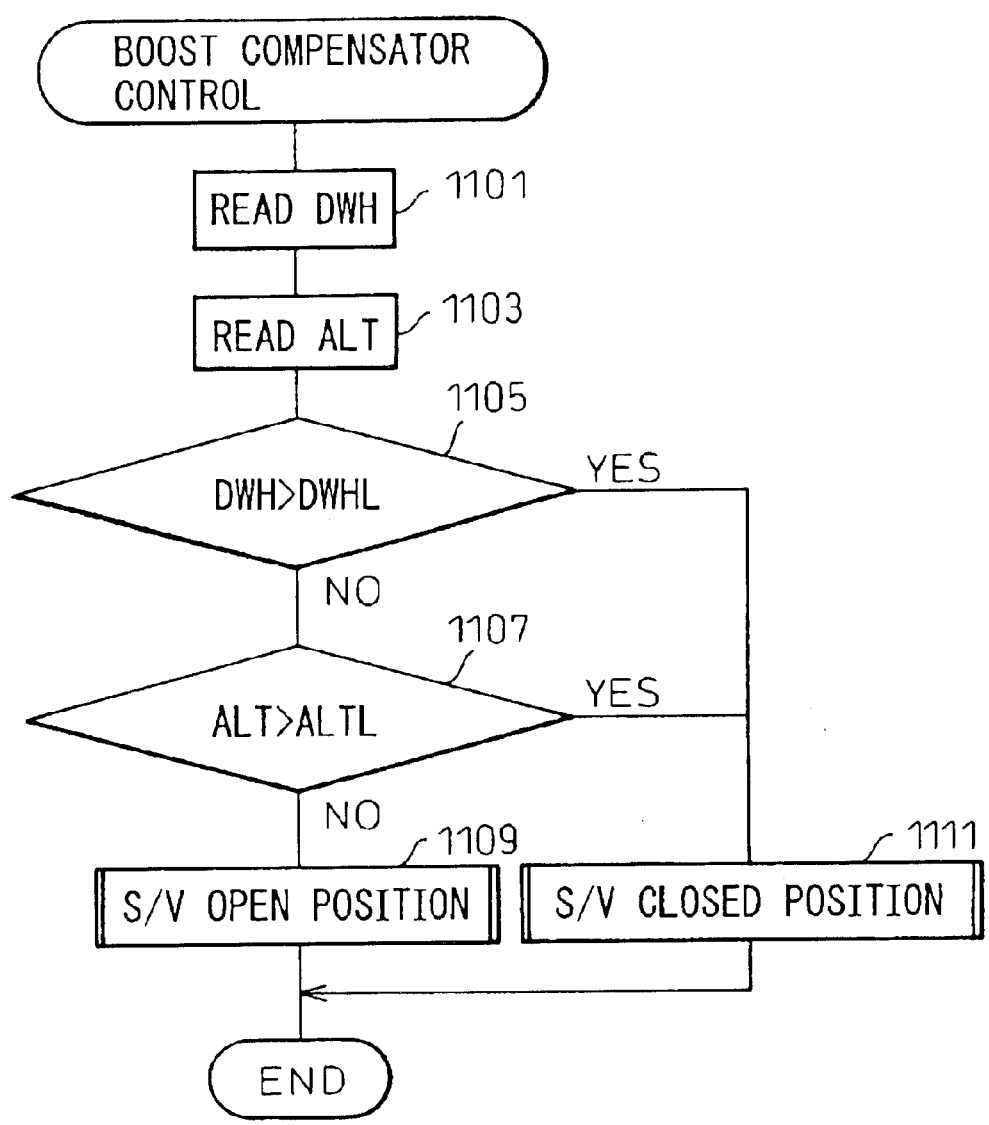
FIG. 11 is a flowchart explaining the boost compensator control operation of the embodiment in FIG. 10.

FIG. 11 is a flowchart explaining the boost compensator control operation of the present embodiment.

The operation in FIG. 11 is different from the operation in FIG. 9 in that the ECU 100 reads the altitude ALT from the altitude sensor 93 (step 1103) in addition to the load DWH and, switches the switching valve 70 to the open position only when the aircraft is in the air (step 1105) and the altitude ALT of the aircraft is lower than a predetermined value ALTL (step 1107). The switching valve 70 is switched to the closed position when the altitude of the aircraft is lower than the predetermined value ALTL even if the aircraft is in the air.

According to the present invention, the maximum limit for fuel injection amount is increased so that a rapid increase in the engine output power is available when the aircraft is flying at a relatively low altitude where the probability of an emergency operation is high.

Figure 12:
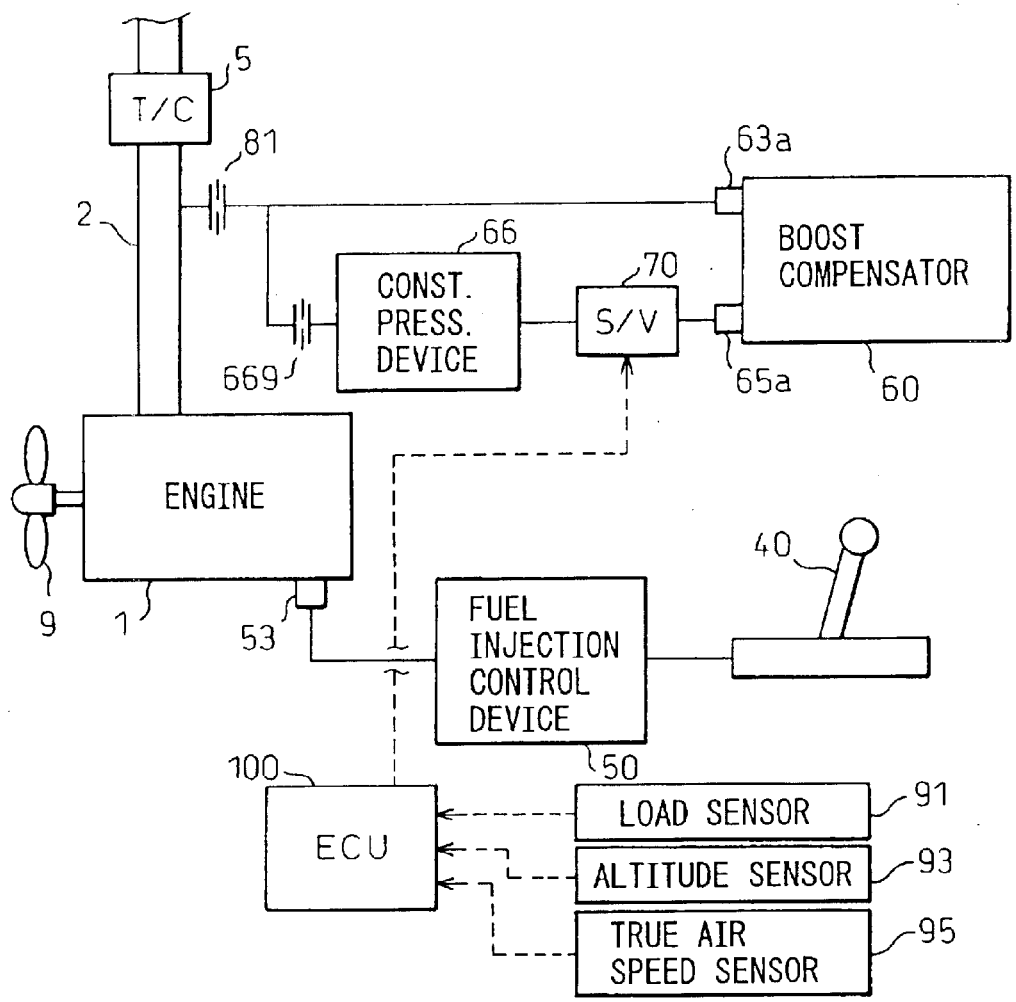
FIG. 12 shows another variation of the embodiment in FIG. 8.

FIG. 12 shows another variation of the embodiment in FIG. 8. In this embodiment, as shown in FIG. 12, an altitude sensor 93 and a true air speed sensor 95 are disposed on the aircraft body in addition to the load sensor 91 in FIG. 8. True air speed sensor 95 detects a flight speed (a true air speed) SPD of the aircraft.

Figure 13:
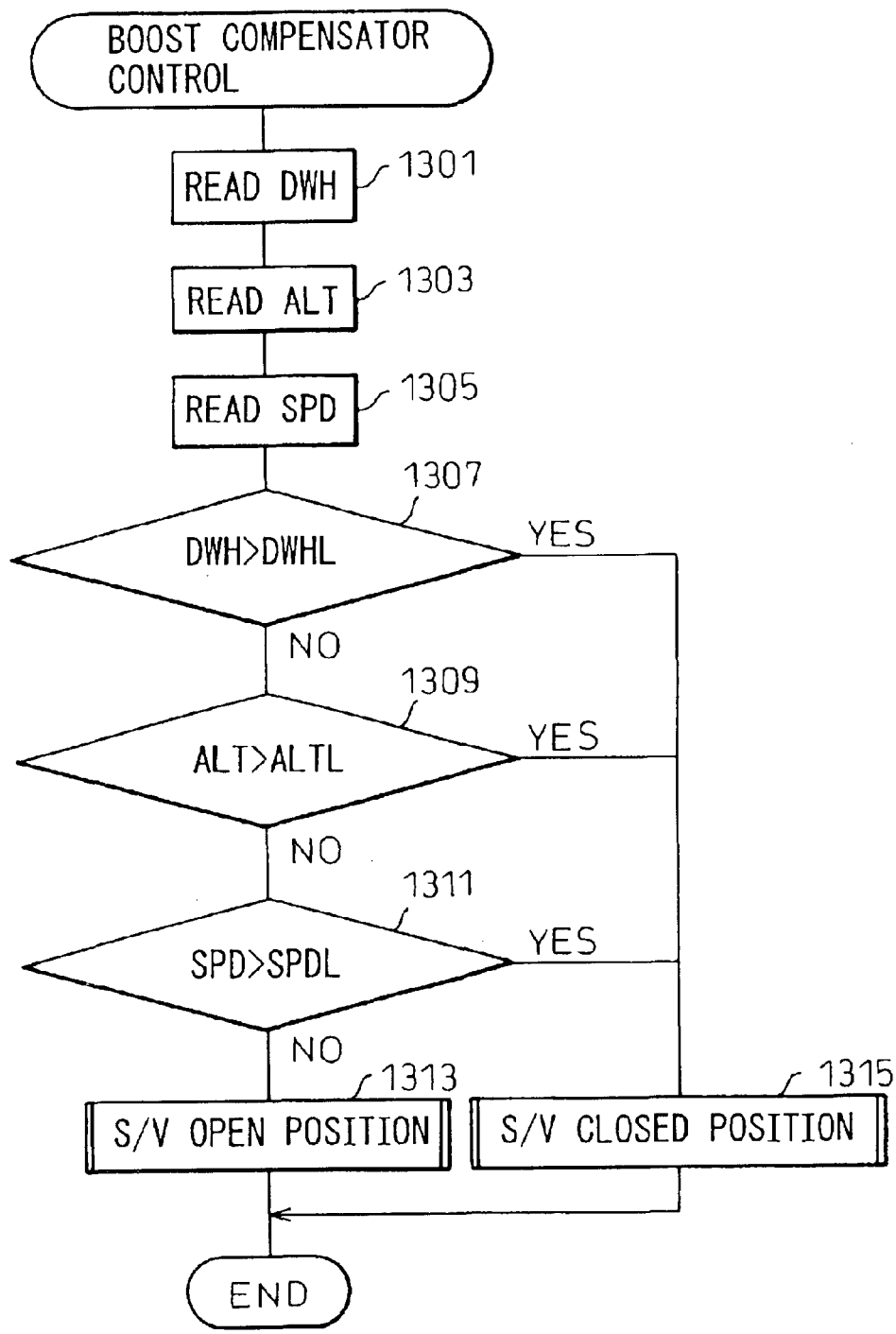
FIG. 13 is a flowchart explaining the boost compensator control operation of the embodiment in FIG. 12.

FIG. 13 is a flowchart explaining the boost compensator control operation in the present embodiment.

As can be seen from FIG. 13, the ECU 100 switches the switching valve 70 to the opening position only when the aircraft is in the air (step 1307) and the altitude ALT of the aircraft is lower than a predetermined value ALTL (step 1309) and, further, the true air speed SPD is lower than a predetermined speed SPDL (step 1311).

According to the present embodiment, the maximum limit for fuel injection amount is increased only in the condition where the necessity for an emergency operation is probable. Therefore, in this embodiment, the possibility of the formation of exhaust smoke during a normal operation becomes very low.

What is claimed is:

1. A control system for a turbo-charged diesel aircraft engine comprising:

a throttle lever;

a fuel setting device that sets the target amount of fuel supplied to the engine in accordance with the amount of stroke of the throttle lever;

a boost compensator that sets the maximum limit for the amount of fuel supplied to the engine in accordance with the boost pressure of the engine;

a fuel supply device that supplies fuel to the engine in an amount equal to the target amount or the maximum limit whichever is smaller;

an operating condition determining means for determining whether the current aircraft operating condition requires a rapid increase in the engine output power; and a switching means for increasing the maximum limit set by the boost compensator when it is determined by the operating condition determining means that the current aircraft operating condition requires a rapid increase in the engine output power.

2. The control system for a turbo-charged diesel aircraft engine, as set forth in claim 1, wherein the boost compensator comprises a boost pressure chamber, to which a boost pressure of the engine is introduced, a backpressure chamber the pressure thereof being maintained at a value different from the boost pressure, the boost compensator setting the maximum limit for the fuel supplied to the engine to a value determined in accordance with the difference between the boost pressure chamber and the backpressure chamber and, the switching means maintaining the pressure in the backpressure chamber of the boost compensator at a predetermined first pressure when it is determined that the current operating condition of the aircraft is not a condition where the rate of increase in the engine output power should be increased and increases the maximum limit for fuel supplied to the engine by changing the pressure in the backpressure chamber from the first pressure to a predetermined second pressure when it is determined that the current operating condition of the aircraft is the condition where the rate of increase in the engine output power should be increased.

3. The control system for a turbo-charged diesel aircraft engine, as set forth in claim 2, wherein the operating condition determining means comprises change rate detecting means for detecting the rate of change in the stroke of the throttle lever and determines that the current operating condition is a condition where the rate of increase in the engine output power should be increased when the rate of change in the stroke of the throttle lever is larger than a predetermined value.

4. The control system for a turbo-charged diesel aircraft engine, as set forth in claim 2, wherein the operating condition determining means comprises a position detecting switch that detects that the throttle lever is moved to a predetermined position and determines that the current operating condition is a condition where the rate of increase in the engine output power should be increased when the throttle lever is moved to the predetermined position.

5. The control system for a turbo-charged diesel aircraft engine, as set forth in claim 2, wherein the operating condition determining means comprises a change-over switch and determines that the current operating condition is a condition where the rate of increase in the engine output power should be increased when the change-over switch is manually activated by the pilot of the aircraft.

6. The control system for a turbo-charged diesel aircraft engine, as set forth in claim 5, wherein the change-over switch is a go-around switch used for canceling an autopilot system of the aircraft when a landing operation is to be aborted, and the operating condition determining means determines that the current operating condition is a condition where the rate of increase in the engine output power should be increased when the go-around switch is activated in order to cancel the autopilot system.

7. The control system for a turbo-charged diesel aircraft engine, as set forth in claim 2, wherein the operating condition determining means comprises a landing determining means for determining whether the aircraft is in the air or on the ground and determines that the current operating condition is a condition where the rate of increase in the engine output power should be increased when it is determined that the aircraft is in the air.

8. The control system for a turbo-charged diesel aircraft engine, as set forth in claim 7, wherein the operating condition determining means further comprises an altitude detecting sensor that detects the flight altitude of the aircraft and determines that the current operating condition is a condition where the rate of increase in the engine output power should be increased when it is determined that the aircraft is in the air and the flight altitude is lower than a predetermined altitude.

9. The control system for a turbo-charged diesel aircraft engine, as set forth in claim 8, wherein the operating condition determining means further comprises a true air speed sensor that detects the flight speed of the aircraft and determines that the current operating condition is a condition where the rate of increase in the engine output power should be increased when it is determined that the aircraft is in the air and the flying altitude is lower than a predetermined altitude and the flight speed of the aircraft is lower than a predetermined speed.

10. The control system for a turbo-charged diesel aircraft engine, as set forth in claim 1, wherein the operating condition determining means comprises change rate detecting means for detecting the rate of change in the stroke of the throttle lever and determines that the current operating condition is a condition where the rate of increase in the engine output power should be increased when the rate of change in the stroke of the throttle lever is larger than a predetermined value.

11. The control system for a turbo-charged diesel aircraft engine, as set forth in claim 1, wherein the operating condition determining means comprises a position detecting switch that detects that the throttle lever is moved to a predetermined position and determines that the current operating condition is a condition where the rate of increase in the engine output power should be increased when the throttle lever is moved to the predetermined position.

12. The control system for a turbo-charged diesel aircraft engine, as set forth in claim 1, wherein the operating condition determining means comprises a change-over switch and determines that the current operating condition is a condition where the rate of increase in the engine output power should be increased when the change-over switch is manually activated by the pilot of the aircraft.

13. The control system for a turbo-charged diesel aircraft engine, as set forth in claim 12, wherein the change-over switch is a go-around switch used for canceling an autopilot system of the aircraft when a landing operation is to be aborted, and the operating condition determining means determines that the current operating condition is a condition where the rate of increase in the engine output power should be increased when the go-around switch is activated in order to cancel the autopilot system.

14. The control system for a turbo-charged diesel aircraft engine, as set forth in claim 1, wherein the operating condition determining means comprises a landing determining means for determining whether the aircraft is in the air or on the ground and determines that the current operating condition is a condition where the rate of increase in the engine output power should be increased when it is determined that the aircraft is in the air.

15. The control system for a turbo-charged diesel aircraft engine, as set forth in claim 14, wherein the operating condition determining means further comprises an altitude detecting sensor that detects the flight altitude of the aircraft and determines that the current operating condition is a condition where the rate of increase in the engine output power should be increased when it is determined that the aircraft is in the air and the flight altitude is lower than a predetermined altitude.

16. The control system for a turbo-charged diesel aircraft engine, as set forth in claim 15, wherein the operating condition determining means further comprises a true air speed sensor that detects the flight speed of the aircraft and determines that the current operating condition is a condition where the rate of increase in the engine output power should be increased when it is determined that the aircraft is in the air and that the flying altitude is lower than a predetermined altitude and that the flight speed of the aircraft is lower than a predetermined speed.

* * * * *